US007225456B2

(12) United States Patent  
Kitsukawa et al.

(10) Patent No.: US 7,225,456 B2  
(45) Date of Patent: May 29, 2007

(54) GATEWAY SCREEN FOR INTERACTIVE TELEVISION

(75) Inventors: Tadamasa Kitsukawa, San Diego, CA (US); Makoto Nijima, San Francisco, CA (US); Tsutomu Akiyama, San Diego, CA (US); Shigeharu Kondo, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1124 days.

(21) Appl. No.: 09/840,437

(22) Filed: Apr. 23, 2001

(65) Prior Publication Data

US 2002/0157108 A1    Oct. 24, 2002

(51) Int. Cl.  
H04N 5/445 (2006.01)  
G06F 13/00 (2006.01)  
G06F 3/00 (2006.01)

(52) U.S. Cl. ..................................... 725/43

(58) Field of Classification Search ........ 725/109–112, 725/40, 43  
See application file for complete search history.

(56) References Cited

U.S. PATENT DOCUMENTS

| | | | | |
|---|---|---|---|---|
| 5,289,271 A | | 2/1994 | Watson | 725/15 |
| 5,377,357 A | * | 12/1994 | Nishigaki et al. | 710/303 |
| 5,410,344 A | | 4/1995 | Graves et al. | 725/46 |
| 5,559,550 A | | 9/1996 | Mankovitz | 725/41 |
| 5,661,517 A | * | 8/1997 | Budow et al. | 725/60 |
| 5,699,107 A | | 12/1997 | Lawler et al. | 348/13 |
| 5,758,257 A | | 5/1998 | Herz et al. | 455/2 |
| 5,798,785 A | | 8/1998 | Hendricks et al. | 725/46 |
| 5,850,218 A | | 12/1998 | LaJoie et al. | 345/327 |
| 5,867,154 A | * | 2/1999 | Berstis et al. | 715/788 |
| 5,880,720 A | * | 3/1999 | Iwafune et al. | 725/24 |
| 5,911,306 A | | 6/1999 | Ferrari | 198/836.1 |
| 5,914,746 A | | 6/1999 | Matthews et al. | 725/132 |
| 5,929,849 A | * | 7/1999 | Kikinis | 725/113 |
| 5,940,073 A | | 8/1999 | Klosterman et al. | 345/327 |
| 5,973,685 A | * | 10/1999 | Schaffa et al. | 715/722 |
| 5,977,964 A | | 11/1999 | Williams et al. | 715/721 |
| 5,978,828 A | | 11/1999 | Greer et al. | 709/224 |
| 5,987,509 A | | 11/1999 | Portuesi | 709/217 |
| 6,005,565 A | * | 12/1999 | Legall et al. | 715/721 |
| 6,025,837 A | | 2/2000 | Matthews, III et al. | 345/327 |

(Continued)

FOREIGN PATENT DOCUMENTS

CN         1236524 A      11/1999

(Continued)

*Primary Examiner*—John Miller  
*Assistant Examiner*—Hunter Lonsberry  
(74) *Attorney, Agent, or Firm*—John L. Rogitz (57) ABSTRACT

A gateway screen for interactive television includes a television content panel and an internet content panel. The gateway screen is displayed by an interactive television (ITV), e.g., when the ITV is turned on. The gateway screen allows a user to quickly and easily view information from multiple sources, e.g., a Web site, a television signal source, and an ITV system server, at a glance. This allows a consumer to gain a quick overview of the information presented by the multiple sources. The gateway screen also allows a consumer to select commonly accessed sources. The gateway screen can be tailored to fulfill a specific consumer's needs and can be established based on preferences input by the consumer.

23 Claims, 3 Drawing Sheets

U.S. PATENT DOCUMENTS

| | | | |
|---|---|---|---|
| 6,028,600 A | 2/2000 | Rosin | 345/327 |
| 6,029,195 A | 2/2000 | Herz | 709/219 |
| 6,061,082 A | 5/2000 | Park | 725/14 |
| 6,072,483 A | 6/2000 | Rosin | 345/335 |
| 6,088,722 A | 7/2000 | Herz et al. | 725/46 |
| 6,133,910 A | 10/2000 | Stinebruner | 725/49 |
| 6,141,003 A | 10/2000 | Chor et al. | 715/719 |
| 6,144,376 A | 11/2000 | Connelly | 725/44 |
| 6,144,402 A | 11/2000 | Norsworthy et al. | 725/109 |
| 6,177,931 B1 | 1/2001 | Alexander et al. | 725/52 |
| 6,195,692 B1 | 2/2001 | Hsu | 709/219 |
| 6,199,206 B1 * | 3/2001 | Nishioka et al. | 725/51 |
| 6,204,886 B1 * | 3/2001 | Yoshimura et al. | 348/564 |
| 6,219,042 B1 | 4/2001 | Anderson et al. | 345/327 |
| 6,219,839 B1 | 4/2001 | Sampsell | 725/40 |
| 6,240,555 B1 | 5/2001 | Shoff et al. | 725/110 |
| 6,260,192 B1 | 7/2001 | Rosin | 345/335 |
| 6,317,881 B1 | 11/2001 | Shah-Nazaroff et al. | 725/24 |
| 6,326,982 B1 | 12/2001 | Wu et al. | 345/718 |
| 6,367,080 B1 | 4/2002 | Enomoto et al. | 725/112 |
| 6,374,404 B1 | 4/2002 | Brotz et al. | 725/46 |
| 6,397,387 B1 | 5/2002 | Rosin | 345/327 |
| 6,434,747 B1 | 8/2002 | Khoo et al. | 725/46 |
| 6,449,767 B1 * | 9/2002 | Krapf et al. | 725/110 |
| 6,469,753 B1 | 10/2002 | Klosterman et al. | 348/552 |
| 6,493,688 B1 | 12/2002 | Dax et al. | 706/20 |
| 6,526,577 B1 * | 2/2003 | Knudson et al. | 725/40 |
| 6,584,613 B1 | 6/2003 | Dunn et al. | 725/122 |
| 6,637,027 B1 | 10/2003 | Breslauer et al. | 725/25 |
| 6,681,393 B1 | 1/2004 | Bauminger et al. | 725/23 |
| 6,698,023 B2 | 2/2004 | Levitan | 725/135 |
| 6,738,978 B1 * | 5/2004 | Hendricks et al. | 725/35 |
| 6,742,033 B1 | 5/2004 | Smith et al. | 709/224 |
| 6,745,223 B1 | 6/2004 | Nobakht et al. | 709/200 |
| 6,756,997 B1 * | 6/2004 | Ward et al. | 715/716 |
| 6,766,524 B1 | 7/2004 | Matheny et al. | 725/23 |
| 6,809,776 B1 | 10/2004 | Simpson | 348/565 |
| 6,859,937 B1 * | 2/2005 | Narayan et al. | 725/37 |
| 2002/0056081 A1 | 5/2002 | Morley et al. | 725/1 |
| 2002/0067376 A1 * | 6/2002 | Martin et al. | 345/810 |
| 2002/0088004 A1 | 7/2002 | Kitsukawa | 725/110 |
| 2002/0129376 A1 | 9/2002 | Tadamasa et al. | 725/110 |
| 2002/0144258 A1 | 10/2002 | Kitsukawa | |
| 2002/0144288 A1 | 10/2002 | Kitsukawa | |
| 2002/0144289 A1 | 10/2002 | Taguchi et al. | 725/112 |
| 2002/0152464 A1 | 10/2002 | Tadamasa et al. | 725/46 |
| 2002/0157092 A1 | 10/2002 | Kitsukawa | 725/90 |
| 2002/0157100 A1 | 10/2002 | Tadamasa et al. | 725/56 |
| 2002/0157107 A1 | 10/2002 | Tadamasa et al. | 725/109 |
| 2002/0157108 A1 | 10/2002 | Kitsukawa | 725/109 |
| 2002/0157109 A1 | 10/2002 | Masahiro et al. | 725/110 |
| 2002/0174425 A1 | 11/2002 | Markel et al. | 725/13 |
| 2004/0103439 A1 * | 5/2004 | Macrae et al. | 725/109 |
| 2004/0117831 A1 | 6/2004 | Ellis et al. | 725/53 |
| 2004/0249726 A1 | 12/2004 | Linehan | 725/110 |
| 2005/0155056 A1 | 7/2005 | Knee et al. | 725/35 |

FOREIGN PATENT DOCUMENTS

| | | |
|---|---|---|
| EP | WO 97/42763 | 11/1997 |
| EP | WO 98/56188 | 12/1998 |
| EP | 1 039 399 A1 | 12/1999 |
| EP | WO 02/19689 A2 | 3/2002 |
| EP | WO 02/086691 A1 | 10/2002 |
| EP | WO 02/087220 A2 | 10/2002 |
| EP | WO 02/087239 A1 | 10/2002 |

* cited by examiner

Fig. 1
ITV System

Fig. 2
ITV Set

Figure 3
OVERALL METHOD

Figure 4
ESTABLISHING CONSUMER PROFILE

GATEWAY SCREEN FOR INTERACTIVE TELEVISION

BACKGROUND OF THE INVENTION

1. Field of the Invention

The present invention relates generally to television systems.

2. Description of the Related Art

Televisions are ubiquitous, as are Internet computers. Currently, however, consumers typically purchase and use two separate systems to enjoy television and Internet access. Namely, consumers must purchase a television to watch television, and a computer to access the Internet. One result not only is that costs are duplicated and significant space is required, but also that undertaking both activities at once, in one room, can be difficult.

Moreover, the need for two systems burdens some consumers who, while familiar with operating a television and its remote control, might not be familiar with operating an Internet computer. Nonetheless, while perhaps not requiring comprehensive Internet support, such consumers can still benefit from advantages provided by simple, straightforward, intuitive Internet interaction. For example, many consumers might only desire easy access to a weather site or traffic site for obtaining up-to-date information before proceeding to work in the morning, without having to know a great deal about how to operate a Web browser. As recognized herein, it consequently would be advantageous to provide an Internet access appliance that is easy and intuitive to use, for instance one that could be used like a television remote control.

To the extent that attempts have been made to combine television with Internet features, the above-noted consumer needs have remained unfulfilled. For instance, in the system known as "WebTV", preselected Internet pages are loaded once into a television during manufacture and never subsequently updated, with the preselected pages being accessible through the television using a computer keyboard with its attendant complexity. Since the pages are not updated, however, many Internet-related features such as up-to-date traffic, weather, and news, are not immediately available. Instead, the consumer must access a central site using one of the preselected pages, and then be redirected to a desired Web page. In terms of currently expected speeds of Internet access, this consumes an undue amount of time. Furthermore, it requires browser or browser-like operations that must be initiated by a consumer who might only wish to turn on the television and immediately access up-to-date information using the relatively simple TV remote control without further ado.

Still further, current systems provide the same preselected Web pages to all consumers. As understood herein, it would be advantageous to tailor, for each consumer, what Web pages are provided in a television to that particular consumer. In this way, a consumer is much more likely to gain useful and enjoyable Internet access than he or she would be able to gain otherwise.

Additionally, as mentioned above, in the above-mentioned WebTV system, a keyboard is required for user input to access Web sites. For television functions, however, consumers are accustomed to using a much simpler input device, namely, a remote control. Thus, existing systems that attempt to integrate television and Internet computers do not do so seamlessly, but rather require the operation of two separate systems that happen to be housed together and that require two separate input devices. This complicates matters for the consumer, and is confusing. The object of the present invention is to address one or more of the above-noted consumer needs.

SUMMARY OF THE INVENTION

A gateway screen for an interactive television includes a television content panel and an Internet content panel. The screen can be cached in memory of the television. The gateway screen allows a consumer to simultaneously view television content and Internet content. Moreover, the gateway screen is displayed when the interactive television is turned on, when the interactive television is turned off, or in response to the consumer toggling a gateway screen button.

In another aspect of the present invention, an interactive television includes a gateway screen that is displayed by the interactive television. The gateway screen includes a television content panel and an Internet content panel. Preferably, the gateway screen is displayed when the interactive television is turned on. Moreover, the gate way screen is displayed when the interactive television is turned off, or when a gateway screen button is toggled. In a preferred embodiment, the gateway screen button is located on the interactive television or on a corresponding remote control unit. Preferably, the television content panel includes content from a television signal source and the internet content panel includes content from a Web server.

In yet another aspect of the present invention, an interactive television system includes a Web server, an interactive television system server, a television signal source, and an interactive television. The interactive television receives information from the Web server, the interactive television system server, and the television signal source. Additionally, the interactive television periodically displays a gateway screen that includes a television content region and an Internet content region.

In still another aspect of the present invention, a method of interactive television includes displaying a gateway screen. The gateway screen enables a consumer to receive information from two or more of: a Web server, an interactive television system server, and a television signal source.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

Figure 1:
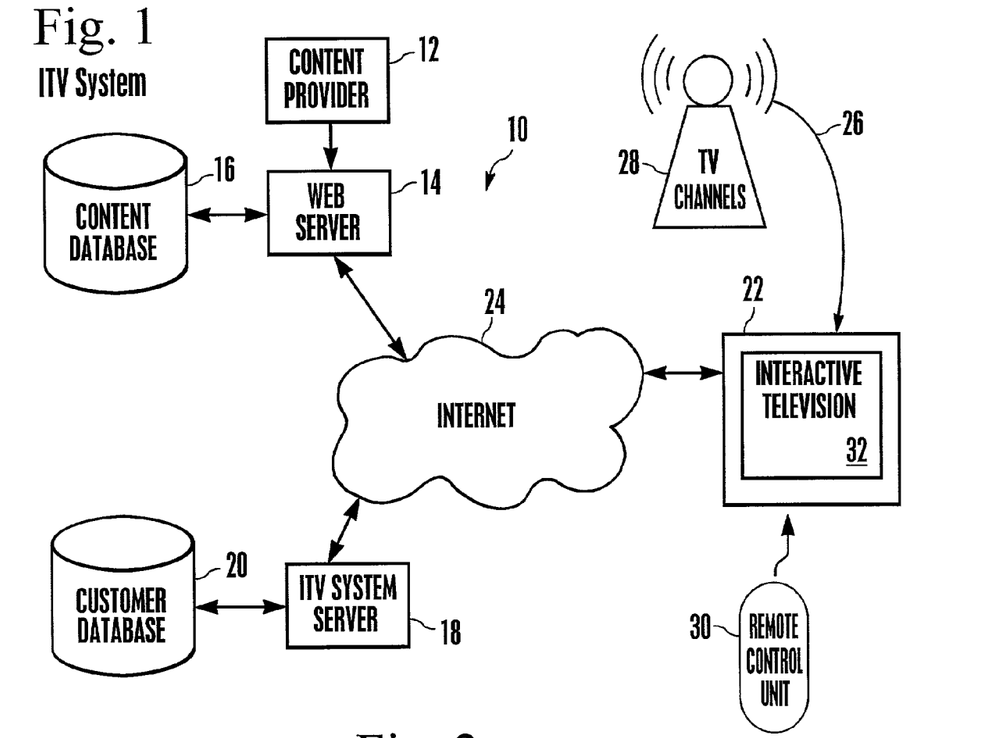
FIG. 1 is a block diagram of the interactive television (ITV) system of the present invention.

Referring initially to FIG. 1, an interactive television (ITV) system is shown, generally designated 10. As show, the system 10 includes one or more content providers 12 that provide various types of content to one or more Web servers 14 (only one content provider 12 and one Web server 14 shown for clarity of disclosure). The Web server 14 accesses a content database 16 for storage of data therein. The content on the Web server 14 can be any appropriate content, including but not limited to hypertext markup language (HTML) pages, .jpeg and .gif image files, .avi and .mpeg movie files, audio files, streaming video, and so on.

In one preferred embodiment, the system 10 also includes an ITV system server 18, which can be, e.g., a Sony Corporation Web portal. The ITV system server 18 can be a Web server computer that accesses a customer database 20. As described further below, the customer database 20 can store customer or consumer profiles that can be used to tailor virtual channels to a profile. Essentially, a virtual channel is downloaded content that is given a number, like conventional TV channels, e.g., a channel number at the end of the sequence of available TV channels. A virtual channel, once its channel number has been selected by the consumer using a TV remote control device, is displayed as a Web page or series of Web pages on the below-described ITV. In one implementation, the content of the virtual channels is stored in memory that is on board the ITV and that is periodically updated via the Internet, or the vertical blanking interval (VBI) of a conventional TV signal. In another implementation, the virtual channel content is stored remote from the ITV, e.g., at a Web server, and is streamed real-time to the ITV via a high-speed Internet access connection.

The servers 14, 18 of the present invention can be implemented by any appropriate computer, such as Internet server computers, personal computers, laptop computers, mainframe computers, and the like. The servers 14, 18 access software to execute portions of the present invention.

Plural consumer ITVs 22 (only a single ITV 22 shown for clarity) access the servers 14, 18 via the Internet 24. Also, each consumer ITV 22 receives television signals 26 from a source 28 of television signals. The source 28 can be plural broadcasters, or a cable television company, or a satellite dish, and so on. A conventional hand-held television remote control unit 30 can be manipulated by a consumer as the consumer views a display area 32 of the ITV 22 to input various selections to the ITV 22 in accordance with disclosure below. It will be appreciated that the remote control unit 30 is not a keyboard or keypad that is associated with a computer. Rather, it is a conventional remote TV control that has numeric buttons, up/down and left/right buttons, and a power button, as well as other buttons that might be conventionally provided on a TV remote control. The functions of the remote unit 30 can also be undertaken by conventional TV buttons on the ITV 22 itself. However, keyboards, keypads, motion-sensing (gesture) devices, and voice recognition input devices can also be used.

Figure 2:
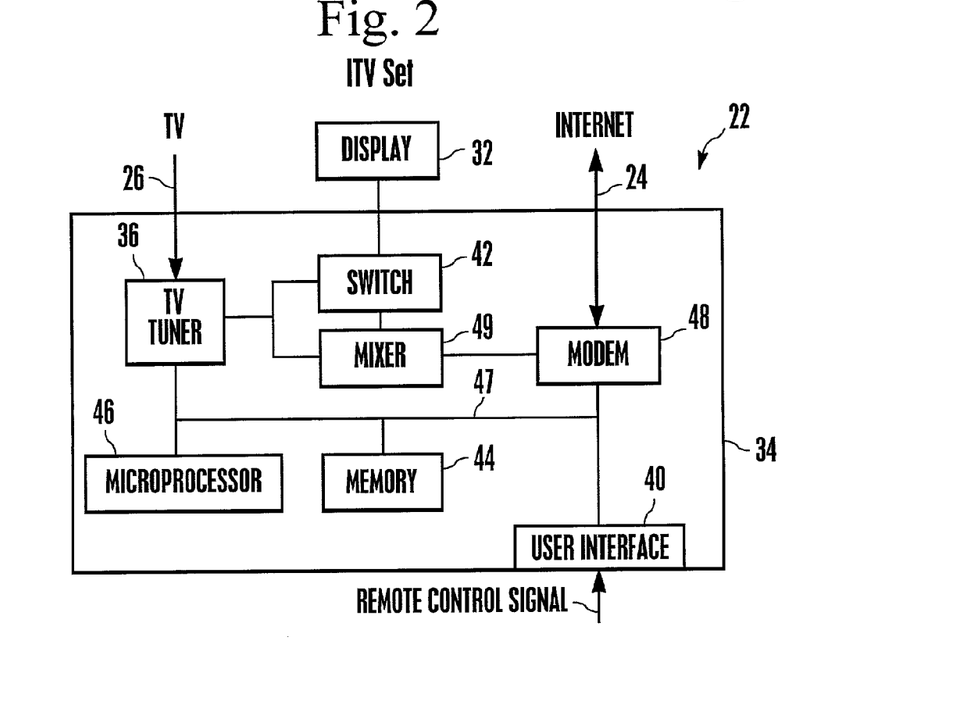
FIG. 2 is a block diagram of the ITV of the present invention.

Now referring to FIG. 2, the ITV 22 is shown. While the embodiment below discusses an ITV 22 with a single housing that supports not only the display but also the microprocessor, virtual channel memory, and in general all of the electrical components shown in FIG. 2, it is to be understood that the term "interactive television" encompasses any apparatus that has a television tuner and the below-described virtual channel capability. For instance, the term "ITV" encompasses the single-housing television shown in FIG. 2, as well as a conventional television in combination with a set-top box that functions in accordance with the present invention. In the latter example, the set-top box might include, e.g., the microprocessor and memory discussed below.

As shown in FIG. 2, the ITV 22 includes a housing 34 that holds a conventional television tuner 36. The TV tuner 36 receives the TV signals 26 and outputs them to a two-position switch 42, which in turn is controlled by a user interface 40 to output a consumer-selected TV channel (in a first position) or virtual channel (in a second position) to the display 32 of the ITV 22. It is to be understood that the user interface 40 can include an infrared receiver or other receiver for sensing remote control signals from the remote control 30. Also, the user interface 40 can include a visual portion, such as but not limited to a cursor that can be moved, by means of the remote control 30, across an electronic channel guide, Web page icon, and so on that are presented on the display 32, to enable a consumer to select a channel for display.

As mentioned above, not only can a consumer select a TV channel, but a virtual channel as well. In accordance with the present invention, a "virtual channel" is not a TV channel per se, but rather a Web-based channel that can be stored in a memory or other data storage 44 in the housing 34. That is, the memory or other data storage 44 can be computer memory, or a hard disk drive, optical drive, solid state storage, tape drive, or any other suitable data storage medium.

A microprocessor 46 is also supported in the housing 34 to execute the logic steps set forth below, with the microprocessor 46, memory 44, TV tuner 36, and switch 42 all being accessible via an internal data bus 47. The microprocessor 46 assigns channel numbers to virtual channels or otherwise maintains a table of channel numbers versus TV channels and virtual channels. Accordingly, when, for instance, an electronic channel guide is displayed on the display 32 of the ITV 22, the virtual channels are listed, typically at the end of the guide after the conventional TV channels, by channel number and by name.

Alternatively, the virtual channels can be stored in a location remote from the ITV 22, e.g., they can be stored at the ITV system server 18, for display of the channels (upon consumer selection thereof) real-time via the Internet (or other network) when data transfer rates are sufficiently high to support such real-time transfer. In any case, the ITV 22 includes a modem 48 that communicates with the Internet 24. The modem 48 can be a cable modem, conventional twisted pair wire modem, DSL, wireless modem, or other appropriate communication device. It is to be understood that a single high data rate cable (e.g., either wire or optical fiber) can be provided to carry both Internet data and TV signals.

In any case, the modem 48 outputs a signal to a mixer 49, which can mix the Web-based signal from the modem 48 with related signals from the TV tuner 36. For instance, if a virtual channel of a cable newscast is selected, the Web-based content can be combined with an actual broadcast newscast from the associated news station for simultaneous display of the newscast in a window of the virtual channel. The signal from the mixer 49 is sent to the switch 42 and thence to the display 32 when the user selects a virtual channel. The mixer 49 can be established by a "Geode" chip made by National Semiconductor. As mentioned above, one or more of the microprocessor 46, memory 44, modem 48, mixer 49, and switch 42 can be housed in a set-top box that is electrically connected to a separate television housing which houses the tuner 36 and display 32.

It may now be appreciated that the microprocessor 46 controls the functions of the ITV 22 in accordance with the logic below. The flow charts herein illustrate the structure of the logic modules of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present microprocessors/servers as a series of computer-executable instructions. In addition to residing on hard disk drives, these instructions may reside, for example, in RAM of the appropriate computer, or the instructions may be stored on magnetic tape, electronic read-only memory, or other appropriate data storage device.

Figure 3:
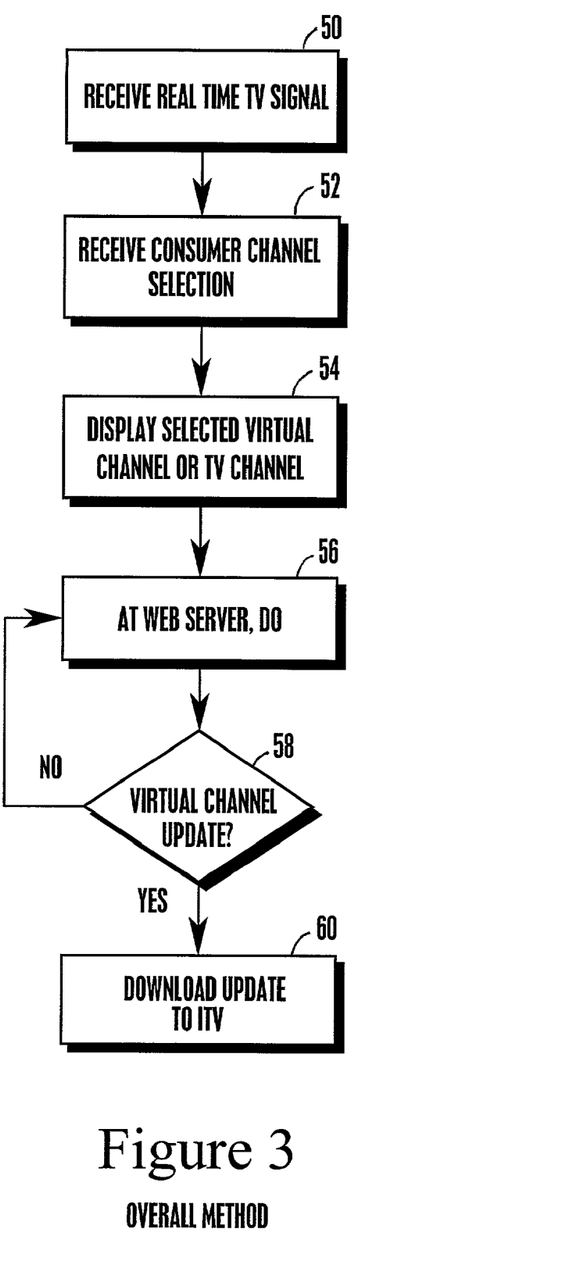
FIG. 3 is a flow chart of the overall method of the present invention.

Now referring to FIG. 3, the overall logic can be seen. Commencing at block 50, real time TV signals 26 are received at the tuner 36. Assuming the ITV 22 is energized, at block 52 consumer channel selections are received by means of the user interface 40, and these channel selections are available to the microprocessor 46. Based on the selections, the microprocessor 46 controls the switch 42 to display the selected TV channel or virtual channel at block 54.

When a virtual channel is selected, the microprocessor 46 retrieves the associated Web page from the memory 44 for display of the channel. When the content of the virtual channel is stored at a Web server 14 that is remote from the ITV 22 (when, for instance, the ITV 22 has high speed Internet access), the microprocessor 46 retrieves the associated Web page directly from the particular server for display of the channel. Accordingly, in the preferred embodiment the ITV 22 can directly access Web servers 14 other than the ITV system server 18.

In accordance with the present invention, the virtual channels are not simply Web pages that remain static for the life of the ITV 22. Instead, they are periodically updated as the underlying Web pages on the respective Web servers 14 are updated. Accordingly, the logic moves from block 54 to block 56 wherein a DO loop is entered at either one or both of the Web server 14 and ITV system server 18. This DO loop can be entered periodically, or it can be entered in response to a user-induced or automatically induced command from the microprocessor 46, sent via the Internet 24.

At decision diamond 58, it is determined, for each virtual channel, whether an update at the corresponding Web site has occurred. The determination at decision diamond 58 can be made by the server 14/18, assuming the server knows the current content of the virtual channels of the ITV 22 (normally the case when the virtual channels are stored at a server remote from the ITV), or it can be made by the microprocessor 46 (normally the case when the virtual channels are stored in the local memory 44). For instance, the server 14/18 can send information pertaining to the update to the microprocessor 46, which can then determine whether the memory 44 stores the latest version of the virtual channel under test. If it does, the logic loops back to block 56. In the event of an update, however, the logic moves to block 60 to download the entire new Web page or pages that establish the virtual channel or, more preferably to download only the changed portions thereof.

The download can be sent via the TV signal 26 in the VBI of the signal, or it can be sent via the Internet 24 (or other network) and modem 48 (by means of a DSL or cable modem line or wireless modem line) to the memory 44. In any case, the virtual channels are periodically updated.

Figure 4:
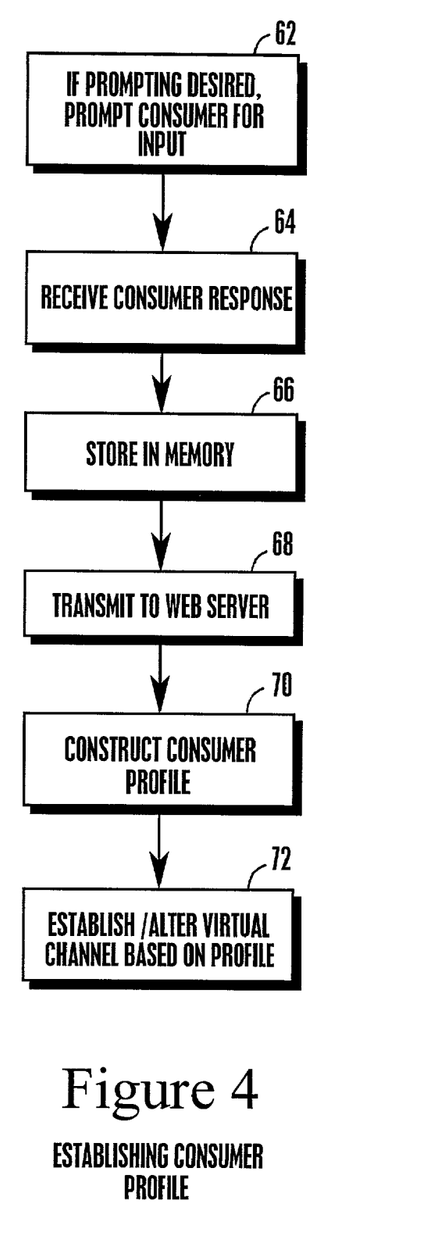
FIG. 4 is a flow chart of the method for establishing and/or changing virtual channels.

FIG. 4 shows the logic undertaken by the microprocessor 46 for establishing or changing what virtual channels are available to a particular ITV 22. Commencing at block 62, if it is desired to prompt the consumer for input, a prompt is displayed. The prompt can be displayed in a channel being viewed by sending the prompt through the VBI of a viewed TV channel or through the Internet when viewing a virtual channel. Alternatively, user channel selections are recorded and used in developing a user profile.

Moving to block 64, the consumer's response is received. The response is ordinarily input by means of the remote control unit 30, although other input devices as discussed above can be used. Accordingly, a prompt might ask a consumer directly what types of virtual channels are of interest. Or, it might ask about the consumer's personal preferences on a number of topics, or about the consumer's personal demographics.

In any case, the response is stored in memory at block 66. Moving to block 68, the response is transmitted to one of the servers 14, 18 (typically to the ITV system server 18). The transmission is via the Internet, and it can be undertaken sometime after the consumer input is stored, e.g., during a low-usage time period. Alternatively, when the ITV 22 is continuously in communication with the Internet, the response can be sent immediately after it is received by the microprocessor 46, without first storing it.

Then, at block 70 a consumer profile can be constructed by the server 18 based on the consumer's responses, using models known in the art to predict what types of content the consumer might desire in the virtual channels of the ITV 22. At block 72, the profile is used to establish and/or alter the virtual channels of the ITV 22 by downloading new content via the VBI or modem 48.

Figure 5:
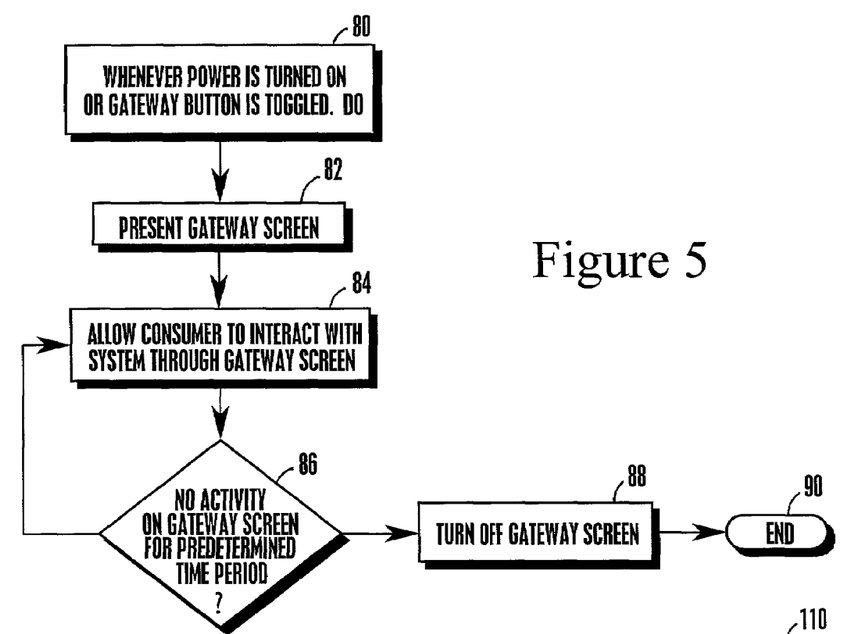
FIG. 5 is a flow chart of the gateway screen logic.

Referring to FIG. 5, the logic undertaken by the microprocessor 46 for presenting a gateway screen is shown. Commencing at block 80, a do loop is entered wherein when the power to the ITV 22 is turned on or a gateway screen button is toggled, the following steps are performed. At block 82, the gateway screen is presented to the consumer through the display 32 of the ITV 22. The gateway screen is cached in the memory 44 or streamed real time from the server 18.

In a preferred embodiment, the gateway screen is intended to act as a starting point in accessing both television and Web-based content available through the ITV system 10. Due to the wide array of content available through the Internet 24 and the television signals 26, an initial reference point, e.g., the gateway screen, is very useful in allowing a consumer who is not extremely familiar with the Internet 24 and its content to access the information available through the ITV system 10. It is to be understood that the gateway screen can be the first screen displayed when the ITV 22 is activated or it can be the last screen displayed when the ITV 22 is de-activated. Moreover, the gateway screen can be displayed at any time while the ITV 22 is activated by toggling a gateway screen button, e.g., on the remote control unit 30.

Preferably, the gateway screen provides access to various information at a glance. This allows a consumer to gain a quick overview of the information presented by the multiple sources, e.g., the Web server 14, the ITV system server 18, or the television signal source 28. The gateway screen also allows a consumer to selected commonly accessed sources. Since the gateway screen is accessed frequently, it is preferred that the content for the gateway screen is cached in the memory 44 of the ITV 22 and updated often.

Continuing the description of the logic shown in FIG. 5, at block 84, the consumer is allowed to interact with the ITV system 10 through the gateway screen. It is to be understood that the consumer interacts with the system 10 by using the remote control unit 30 to move a cursor around on the gateway screen in order to further access information presented therein. Returning to the description of the logic, at decision diamond 86 it is determined whether no activity has occurred at the gateway screen for a predetermined time period, e.g., five seconds. If not, the logic moves to block 88 where the gateway screen is turned off. Thereafter the logic ends at state 90. If at decision diamond 86 there is activity at the gateway screen, e.g., the consumer is moving a cursor around to view different information and interact with the ITV system 10, the logic returns to block 84 and the logic continues as described above.

Figure 6:
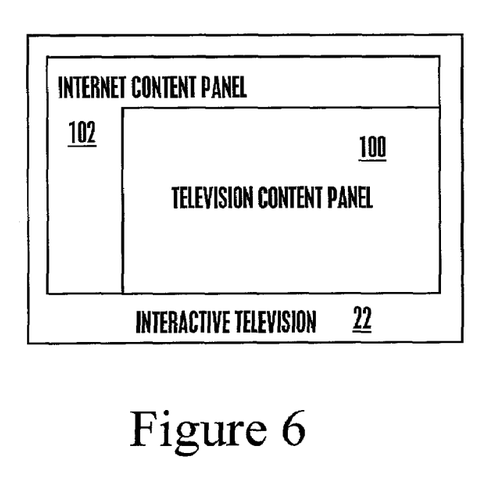
FIG. 6 is a schematic representation of the gateway screen.

Referring now to FIG. 6, an ITV unit, e.g., the ITV 22 described above is shown. An exemplary gateway screen is shown in the display area 32 of the ITV 22. It is to be appreciated that the configuration of the gateway screen shown in FIG. 6 is but one of many ways that the gateway screen can be configured. For example, FIG. 6 shows that the gateway screen includes a television content panel 100, and an Internet content panel 102. As such, each panel 100, 102 presents channel content from a respective television or Internet content provider, or combination thereof. In a preferred embodiment, the content in the Internet panel 102 is related to the content in the television panel 100. For instance, the content in the Internet panel 102 might be derived from the Web site of a cable news network, and the content in the television panel 100 would be a broadcast video feed either real-time from the TV tuner 36 or cached onboard memory 44 and played in a loop.

It is to be appreciated that when the content provider is a television channel source 28, the television content panel 100 displays the current broadcast video from the television signal 26, a portion of that video, or information derived from the television signal 26, e.g., information in the VBI or information included in the transport stream of a digital television signal. When the content provider is a server, e.g., the Web server 14 or the ITV system server 18, the Internet content panel 102 can present Internet content directly, or derive information from the server and present the result.

It is also to be appreciated that the configuration of the gateway screen and the content provided thereby can be tailored for different situations, e.g., time of day or condition of access. As such, the gateway screen can have one set of content panels for system activation, one set of content panels for system de-activation, and different sets of content panels for different times of day. It is intended that the content panels 100, 102 serve as links to the respective content providers. Accordingly, a consumer can access a particular content provider through its respective content panel, e.g., by selecting the panel with a pointing device and issuing a selection/access command (in other words, a point and click process).

Also, a consumer can access a specific area of a particular content provider through a specific area of the respective content panel. For example, the TV content panel 100, can present the video content from a news broadcast without modification. If the consumer chooses the panel, e.g., by pointing and clicking, a full screen display of the broadcast channel is presented. Additionally, the Internet content panel 102 can present news headlines from one or more news Web sites and/or virtual channels. Again, if the consumer chooses the panel a full screen display of the Web site is presented. Moreover, choosing a specific headline causes the ITV system 10 to present the text corresponding to the headline or the section of the Web site corresponding to the headline.

Figure 7:
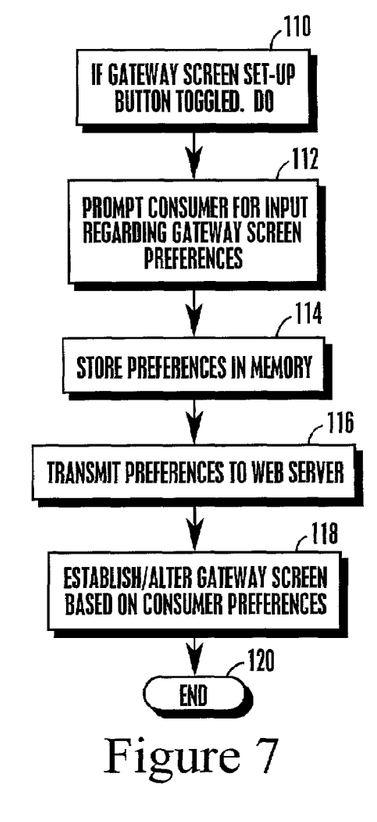
FIG. 7 is a flow chart of the logic for establishing or changing the gateway screen.

FIG. 7 shows the logic undertaken by the microprocessor 46 for establishing or changing the configuration of the gateway screen provided by the ITV 22. Commencing at block 110, a do loop is entered wherein if a gateway screen set-up button is toggled, e.g., on the remote control unit 30, the succeeding logic steps are performed. Proceeding to block 112, the consumer is prompted for input regarding gateway screen preferences. For example, the consumer may desire that the ITV system 10 present information pertaining to top news stories via the Internet content panel 102. Accordingly, a prompt might ask a consumer directly what types of web sites, or virtual channels relating thereto, are to be presented by the gateway screen. Thus, the consumer can input these preferences in response to the prompt presented at block 112. It is to be appreciated that the response to the prompt ordinarily is input by using the remote control unit 30.

In any case, the response is stored in memory at block 114. Moving to block 116, the response is transmitted to one of the servers 14, 18 (typically to the ITV system server 18). The transmission is via the Internet, and it can be undertaken sometime after the consumer input is stored, e.g., during a low-usage time period. Alternatively, when the ITV 22 is continuously in communication with the Internet, the response can be sent immediately after it is received by the microprocessor 46, without first storing it. Then, at block 118 the preferences input by the consumer are used to establish and/or alter the gateway screen of the ITV 22.

Accordingly, the ITV system server 18 provides content information for the gateway screen content panels 100, 102 that is customized, e.g., to particular television channels 26, particular Web servers 14, and/or particular virtual channels. In other words, a particular panel, e.g., the Internet content panel 102 can include a list of topics that are currently being discussed on other sources, e.g., news programs.

While the particular GATEWAY SCREEN FOR INTERACTIVE TELEVISION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. An interactive television, comprising:
   a gateway screen displayed by the interactive television at least upon initial energization of the television, the gateway screen having:
   at least one television content panel; and
   at least one Internet content panel displaying content related to the content in the television content panel, wherein the gateway screen is a last screen displayed in response to receiving a signal to deenergize the interactive television.

2. The interactive television of claim 1, wherein the gateway screen is displayed when the interactive television is turned on.

3. The interactive television of claim 1, further comprising a gateway screen button and the gateway screen is displayed when the gateway screen button is toggled.

4. The interactive television of claim 1, further comprising a remote control unit, the remote control unit having a gateway screen button and the gateway screen is displayed when the gateway screen button is toggled.

5. The interactive television of claim 1, wherein the television content panel includes content from at least one television signal source.

6. The interactive television of claim 1, wherein the internet content panel includes content from at least one Web server.

7. An interactive television system, comprising:
   at least one Web server;
   at least one interactive television system server;
   at least one television signal source; and
   at least one interactive television, the interactive television receiving information from the Web server, the interactive television system server, and the television signal source, the interactive television periodically displaying a gateway screen, the gateway screen having at least one television content region and at least one Internet content region, the gateway screen being automatically displayed upon energization of the television, wherein the gateway screen is displayed in response to receiving a signal to deenergize the interactive television.

8. The interactive television system of claim 7, wherein the gateway screen is displayed when the interactive television is turned on.

9. The interactive television system of claim 7, further comprising a gateway screen button and the gateway screen is displayed when the gateway screen button is toggled.

10. The interactive television system of claim 7, further comprising a remote control unit, the remote control unit having a gateway screen button and the gateway screen is displayed when the gateway screen button is toggled.

11. The interactive television system of claim 7, wherein the television content panel includes content from the at least one television signal source.

12. The interactive television system of claim 7, wherein the Internet content panel includes content from the at least one Web server.

13. A method of interactive television, comprising the acts of:
   displaying a gateway screw in response to a user turning the television on; and
   enabling a consumer to receive information from at least two of: at least one Web server, at least one interactive television system server, and at least one television signal source via the gateway screen, wherein the gateway screen is displayed in response to receiving a signal to deenergize the interactive television.

14. The method of claim 13, wherein the gateway screen includes at least one television content panel and at least one Internet content panel.

15. The method of claim 13, wherein the gateway screen is displayed when the interactive television is turned on.

16. The method of claim 13, wherein the gateway screen is displayed when a gateway screen button is toggled.

17. The method of claim 14, wherein the television content panel includes content from the at least one television signal source.

18. The method of claim 14, wherein the internet content panel includes content from the at least one Web server.

19. The method of claim 13, further comprising the acts of:
   receiving consumer input via a conventional TV control device; and
   establishing the gateway screen based at least in part on the consumer input.

20. The method of claim 13, wherein the gateway screen is stored in a memory within an interactive television.

21. The gateway screen of claim 1, wherein content in the Internet content panel is related to content in the television content panel.

22. The gateway screen of claim 21, wherein content in the television content panel is received real-time from a broadcast.

23. The gateway screen of claim 21, wherein content in the television content panel is received from a storage associated with the television.

* * * * *

UNITED STATES PATENT AND TRADEMARK OFFICE
CERTIFICATE OF CORRECTION

PATENT NO. : 7,225,456 B2  
APPLICATION NO. : 09/840437  
DATED : May 29, 2007  
INVENTOR(S) : Tadamasa Kitsukawa et al.

It is certified that error appears in the above-identified patent and that said Letters Patent is hereby corrected as shown below:

On the title page, item (75)  
Second inventor's name should be listed as Makoto Niijima Signed and Sealed this Seventh Day of August, 2007

JON W. DUDAS  
*Director of the United States Patent and Trademark Office*